United States Patent Office 2,756,847
Patented July 31, 1956

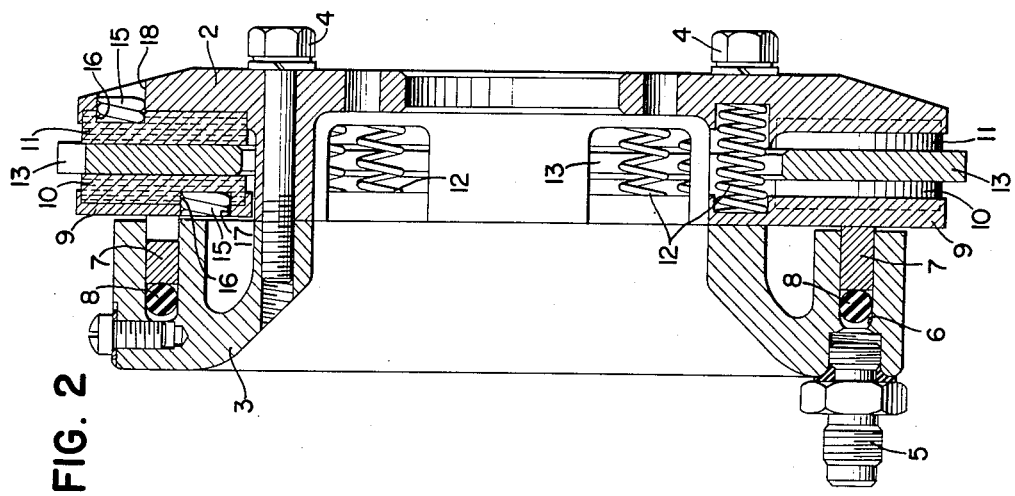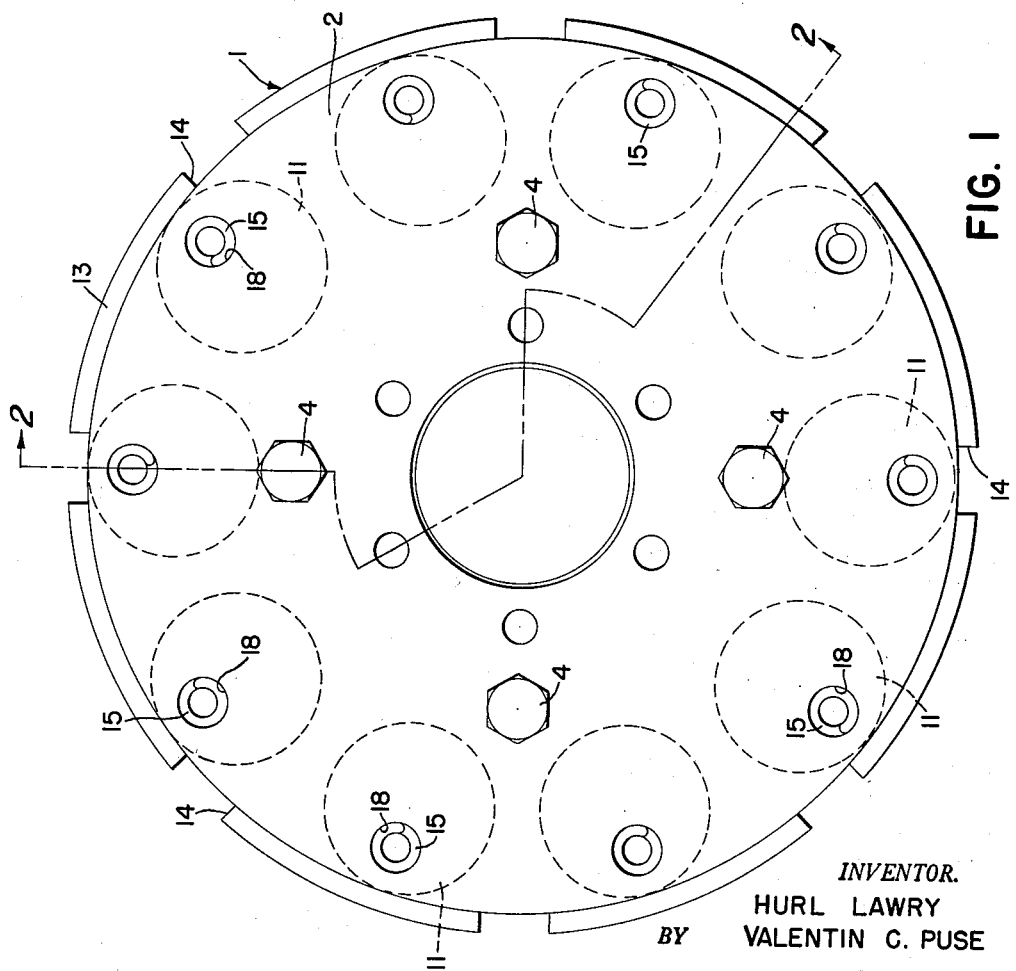

2,756,847

BRAKE HAVING COIL SPRING FASTENER THEREIN

Valentin C. Puse, Cuyahoga Falls, and Hurl Lawry, Akron, Ohio, assignors, by mesne assignments, to The Goodyear Tire & Rubber Company, a corporation of Ohio Application September 21, 1953, Serial No. 381,296

6 Claims. (Cl. 188—234)

This invention relates to brakes, and particularly to brake combinations wherein coil spring means are used for securing brake linings to brake actuation or carrier means.

In the manufacture and use of various types of brakes, and particularly aircraft brakes, it is difficult to secure the brake lining means or blocks in the brakes to the carrier plates, anvils, pistons or other means used for securing the brake lining means operatively in a brake assembly. The brake asemblies are in many instances subjected to severe and repeated vibrations which tend to loosen the brake assembly and particularly to weaken the bond of the brake lining to its positioning member. Of course, it should also be noted that severe stresses are applied to aircraft brakes when used and the brakes must operate satisfactorily for safety reasons so that it is particularly important that the various brake components be accurately and tightly positioned with relationship to each other and that a minimum of maintenance work be required on the brake assemblies.

Thus a general object of the present invention is to provide a novel type of a brake assembly which is characterized by the use of coil spring fastener means for securing brake linings to positioning means therefor in the brake assembly.

Another object of the invention is to provide a relatively inexpensive type of means for securing brake linings in brake assemblies and which means can be relatively easily secured in position to retain the brake lining in desired operative relationship to carrier means in a brake for a long service life and with a minimum of maintenance being required on such brake assembly.

A further object of the invention is to use a slightly radially compressed coil spring extending between a counterbore in a brake lining and a counterbore or hole in a brake member in order to secure such brake lining to the brake member.

Another object of the invention is to provide a brake assembly the components of which are especially adapted to resist loosening by vibration of the brake assembly.

The foregoing and other objects and advantages of the invention will be made more apparent as the specification proceeds.

In order to understand the invention completely, reference is directed to the accompanying drawings which illustrate one currently preferred embodiment of apparatus embodying the principles of the invention, and wherein:

Fig. 1 is an elevation of a brake assembly of the invention; and

Fig. 2 is a section of the brake assembly of Fig. 1 taken on line 2—2 thereof.

The present invention relates to a brake combination wherein a brake lining positioning member is provided and has holes extending thereinto from one face thereof, and brake lining means are also provided and have counterbores or holes extending thereinto from one face thereof with the brake lining means being so positioned that the holes therein are aligned with and form extensions of the holes in the brake lining positioning member. Longitudinally solid coil springs having normal outer diameters slightly larger than the diameters of the holes are resiliently positioned in the holes and extend between corresponding holes in the brake lining means and brake lining positioning member in order to secure the brake lining means to the brake lining positioning member.

Reference now is made to the details of the structure shown in the drawings, and a brake assembly is shown and is indicated as a whole by the numeral 1. The brake assembly 1 includes a brake anvil 2 secured to a brake housing 3 of any desired construction by suitable means, such as cap screws 4. The brake housing 3 has conventional means of any desired type thereon for actuating the braking means of the brake assembly 1 and a fitting 5 is shown engaged with the brake housing 3 for connection to suitable hydraulic pressure means for brake actuation. The fittings connect to an annular bore or chamber 6 provided in the brake housing 3 and which has a piston or operating ring 7 slidably positioned therein and sealed in the chamber 6 by a conventional O-ring 8. Thus the ring 7 can be moved axially of the brake housing 3 for brake actuation, as hereinafter pointed out.

A brake pressure plate 9 is provided in the brake and it has a plurality of cylindrical blocks of brake lining 10 associated therewith and carried thereby whereas similar blocks or discs of brake lining 11 are provided in association with and carried by the axial inner face of the brake anvil 2. The operating ring 7 bears on and may be secured to the brake presure plate 9 to move it axially for brake action. The brake anvil 2 and brake pressure plate 9 have resilient means, such as coil springs 12 compressed therebetween at circumferentially spaced points to aid in providing operative clearance in the brake when it is not actuated.

The brake assembly 1 is completed by means of a center carrier member or brake disc 13 positioned intermediate the brake linings 10 and 11 for operative engagement with the adjacent faces thereof on brake actuation. The center carrier member 13 has circumferentially spaced slots 14 provided in the periphery thereof for engaging the center carrier member 13 with interlocking means provided on and rotating with an aircraft wheel or similar member in order to transmit braking forces applied to the center carrier member 13 to the wheel or other member to be braked.

An important feature of the present invention resides in the particular means used for securing the brake linings 10 and 11 to the faces of the brake pressure plate 9 and brake anvil 2, respectively. Thus coil springs 15 are shown engaged with cylindrical recesses or counterbores 16 provided in opposed faces of the brake linings 10 and 11 and with such springs 15 extending into counterbores or holes 17 and 18, respectively, provided in the brake pressure plate 9 and the brake anvil 2. The holes or countrebores 17 and 18 are of identical size diameters as the counterbores 16 in the brake lining means and with such holes 17 and 18 being exactly aligned with and being provided, of course, in corresponding portions of the brake lining positioning means in relation to the position of the counterbores 16 in the brake linings. These coil springs 15 have their convolutions in longitudinally abutting relation so that no longitudinal play is provided in the coil springs 15. The coil springs 15 are initially made to a natural outer diameter slightly larger than the diameter of the counterbores 16 and holes 17 and 18. For example, when such counterbores are from about ⅜ of an inch to ½ inch in diameter, the springs 15 have an outside diameter of about .015 to .020 of an inch greater than the diameter of the counterbores so that with a counterbore of .375 inch in diameter, the springs 15 would have an external diameter of between .390 to .395 inch in diameter. If the diameter of the counterbore varies, then the external diameter of the coil springs used in such counterbores would correspondingly vary so that, so example, should a ¾ inch hole be used, then the external diameter of the coil spring used should be .030 to .040 of an inch greater than that of the hole itself. Thus the coil springs are several thousandths of an inch larger than the holes in which they are to be positioned and are in proportion about .040 inch in diameter larger per inch of diameter than the receiving bore or recess. Hence the coil springs must be radially compressed slightly when inserted into engagement with the counterbores or holes provided, which radial compression remains in the coil springs after being forced into engagement with the brake lining means and brake positioning means. This provides and maintains a resilient fastener in engagement with both of the associated members to maintain the brake linings in fixed, tightly positioned relationship to the brake lining carrier member.

In one instance, a coil spring 15 was made to about ⅜ of an inch in external diameter from wire which had a maximum diameter of between .080 inch to .090 inch in diameter so that an open center area is provided in the coil spring to permit compression thereof radially for resilient engagement with brake linings and carrier means.

The brake means of the invention may have any desired type of wear take-up means therein, and the brake may be of any known construction. The brake linings may be secured to brake pistons or other brake lining positioning members, as required in other brake constructions by use of the novel construction of the invention.

Yet another factor which aids in determining the amount of overage in normal external diameter of the coil springs with relation to the holes in which they are received is the diameter of the wire from which the coil springs are formed. Thus a wire of larger diameter than that of the spring in the example given hereinabove when made into a coil spring, would have a spring diameter less than .040 inch in diameter larger per inch of bore or recess in which it would be received. As long as the spring is larger than its receiving bore, and strong enough to have a good resilient engagement with the walls of the receiving bore or recess, the objects of the invention can be achieved.

From the foregoing, it is contended that a relatively inexpensive type of a brake assembly has been provided which has the brake lining means thereof in permanent engagement with the brake lining carrier means so that repeated vibration of the brake assembly will not shake or vibrate the brake lining positioning means loose so that the objects of the invention are achieved.

While certain representative embodiments and details have been shown for the purpose of illustrating the invention, it will be apparent to those skilled in this art that various changes and modifications may be made therein without departing from the spirit or scope of the invention.

What is claimed is:

1. In combination, a brake lining positioning member having cylindrical holes extending thereinto from one face thereof, brake lining means having cylindrical holes extending thereinto from one face thereof, the holes in said brake lining means being positioned correspondingly to the holes in said brake lining positioning member with the holes all being of the same diameter, the said faces of said brake lining positioning member and brake lining means being abutted with corresponding holes being aligned, and longitudinally solid coil springs having normal outer diameters slightly larger than the diameters of said holes received in said holes and extending between corresponding holes in said abutted faces to secure said brake lining means to said brake lining positioning member.

2. In combination, a brake lining positioning member having smooth walled holes extending thereinto from one face thereof, brake lining means having smooth walled holes extending thereinto from one face thereof, the holes in said brake lining means being positioned correspondingly to the holes in said brake lining positioning member and with the holes all being of the same diameter, the said faces of said brake lining positioning member and brake lining means being abutted and with corresponding holes being aligned, and longitudinally solid coil springs having normal outer diameters larger in the proportion of about .040 inch per inch than the diameters of said holes received in said holes and extending between corresponding holes in said abutted faces to secure said brake lining means to said brake lining positioning member with slight resiliency therebetween.

3. In a brake, a brake pressure plate having holes extending transversely thereof, a brake lining having a face abutting said brake pressure plate, said brake lining having holes extending into said face thereof in alignment with and of the same diameter as said holes in said brake pressure plate, and coil springs in individual radial compression resilient pressure engagement with the walls of the aligned holes in said brake lining and said brake pressure plate and extending therebetween to secure said brake lining to said brake pressure plate but to permit slight resilient movement of said brake lining with reference to said brake pressure plate.

4. In a brake, a cylindrical member having a counterbore extending thereinto of about ⅜ inch in diameter, a brake lining abutted against said member and the counterbore thereof and having a cylindrical counterbore extending thereinto of the same size as and forming a continuation of said first named counterbore, and a coil spring resiliently received in and extending between said counterbores, said coil spring being made from wire having a diameter of from about .080 to .090 inch and having a normal outer diameter of from about .015 to .020 inch greater than the diameter of said counterbores, said coil spring having its convolutions abutted.

5. In a brake, a member having a counterbore extending thereinto, a brake lining abutted against said member and the counterbore thereof and having a counterbore extending thereinto of the same size as and forming a continuation of said first named counterbore, and a coil spring resiliently received in and extending between said counterbores, said coil spring having a normal outer diameter several thousandths of an inch greater than the diameter of said counterbores, said coil spring having its convolutions abutted.

6. In a brake, a member having a counterbore extending thereinto, a brake lining abutted against said member and the counterbore thereof and having a counterbore extending thereinto of the same size as and forming a continuation of said first named counterbore, and a coil spring radially compressed in and extending between said counterbores, said coil spring having its convolutions abutted.

References Cited in the file of this patent

UNITED STATES PATENTS

| | | |
|---|---|---|
| 839,260 | Benson | Dec. 25, 1906 |
| 893,555 | Sullivan | July 14, 1908 |
| 1,790,500 | Fischer | Jan. 27, 1931 |
| 1,796,255 | White | Mar. 10, 1931 |
| 1,882,943 | Ross | Oct. 18, 1932 |
| 1,947,839 | Fissell | Feb. 20, 1934 |
| 1,957,959 | Herman | May 8, 1934 |
| 2,063,090 | Geiger et al. | Dec. 8, 1936 |
| 2,542,579 | Sanders | Feb. 20, 1951 |